United States Patent
Rowland

(10) Patent No.: US 6,640,528 B1
(45) Date of Patent: Nov. 4, 2003

(54) TRACTOR MOUNTED BOOM SYSTEM THAT IS CONVERTIBLE BETWEEN A BACKHOE AND A ROTARY CUTTING SYSTEM

(76) Inventor: Scott Rowland, 6551 Dwight Rowland Rd., Willow Springs, NC (US) 27592

( * ) Notice: Subject to any disclaimer, the term of this patent is extended or adjusted under 35 U.S.C. 154(b) by 0 days.

(21) Appl. No.: 10/041,918

(22) Filed: Jan. 8, 2002

(51) Int. Cl.$^7$ .................... A01D 34/86; A01D 34/64
(52) U.S. Cl. ............................................. 56/15.2
(58) Field of Search ........................ 56/10.9, 11.9, 56/15.2, 15.1, 15.4, 15.6, 15.7, 15.9, DIG. 11, DIG. 14; 37/104, 301, 302

(56) References Cited

U.S. PATENT DOCUMENTS

| | | | |
|---|---|---|---|
| 3,063,225 A | 11/1962 | Barrentine | |
| 4,769,977 A | 9/1988 | Milbourn | |
| 4,996,830 A | 3/1991 | Davison | |
| 5,174,098 A | * 12/1992 | Emery | 56/10.7 |
| 5,210,997 A | 5/1993 | Mountcastle, Jr. | |
| 5,341,629 A | * 8/1994 | Penner | 56/15.2 |
| 5,511,368 A | 4/1996 | Kocher | |
| 6,047,531 A | * 4/2000 | Bryan, III | 56/15.2 |

* cited by examiner

Primary Examiner—Robert E. Pezzuto
(74) Attorney, Agent, or Firm—Coats & Bennett, P.L.L.C.

(57) ABSTRACT

A tractor mounted boom structure is provided where the boom is adapted, in one mode, to connect a rotary cutter and in a second mode is adapted to connect to a bucket to form a backhoe. The system comprises a mainframe structure adapted to be mounted to a tractor such as by a three-point hitch associated with a tractor. Extending from the frame structure is a first or Primary boom. Connected to the end of the first boom is a second boom. An array of hydraulic cylinders is provided that enables the first boom to articulate with respect to the frame structure and permits the second boom to articulate with respect to the first boom. The second boom is provided with a connector assembly that enables the second boom to be connected to either a rotary cutter or to a bucket. When used to support a rotary cutter, the first boom is generally maintained in a locked position with respect to the mainframe structure of the system. On the other hand, when the system is converted to a backhoe, the first boom is unlocked with respect to the mainframe and in fact is provided with a hydraulic cylinder for articulating the second boom with respect to the frame structure about a generally vertical axis.

18 Claims, 4 Drawing Sheets

TRACTOR MOUNTED BOOM SYSTEM THAT IS CONVERTIBLE BETWEEN A BACKHOE AND A ROTARY CUTTING SYSTEM

FIELD OF THE INVENTION

The present invention relates to tractor-mounted systems and implements, and more particularly to tractor-mounted rotary cutters and tractor-mounted backhoes.

BACKGROUND OF THE INVENTION

Rotary cutters are used widely to cut grass, bushes and other vegetation along roadsides and other areas. Typically it is known to mount a rotary cutting system to the rear of a tractor such as through a three-point hitch attachment. These rotary cutting systems are typically mounted to the end of a boom structure and the boom structure generally extends outwardly from the rear of the tractor. Such systems are typically hydraulically driven and the rotary cutter is mounted such that it can be articulated so as to assume various positions with respect to the boom structure. This enables the rotary cutter to cut various angled ditch banks and other inclined and undulating surfaces.

Also, it is known to mount a backhoe to a tractor and to power the backhoe through the power-take-off-system of the tractor. Backhoes of this design are useful in a wide variety of jobs. They are particularly useful in the construction industry and can be used for digging footings, excavating for septic systems and for a wide variety of other construction-related jobs.

Boom systems of the type just discussed are relatively expensive. Because of that expense, owners of such systems have to consider the capital cost of these systems when charging for their use. It follows that the relatively high costs of such tractor-mounted boom system can be reduced by utilizing various implements or heads with a single boom system.

SUMMARY OF THE INVENTION

The present invention relates to a tractor-mounted system that is convertible from a rotary cutting system to a backhoe. The tractor-mounted system includes a frame structure for mounting to the tractor. Connected to the frame structure and extending therefrom is a boom structure. In one mode of operation, the boom structure is connected to a rotary cutter for cutting grass and other vegetation. The rotary cutter is adapted to be detachably connected to the boom structure. In another mode of operation, the boom structure is adapted to be connected to a bucket such that the system is effectively converted to a backhoe.

In one specific embodiment of the present invention, when the tractor-mounted system is converted to a backhoe, there is provided an operator's station that is independent of the tractor. The operator station includes a seat and a control panel which in the case of one embodiment includes a series of control valves for controlling a hydraulic system that powers the working components of the backhoe.

DESCRIPTION OF AN EXEMPLARY EMBODIMENT

Figure 1:
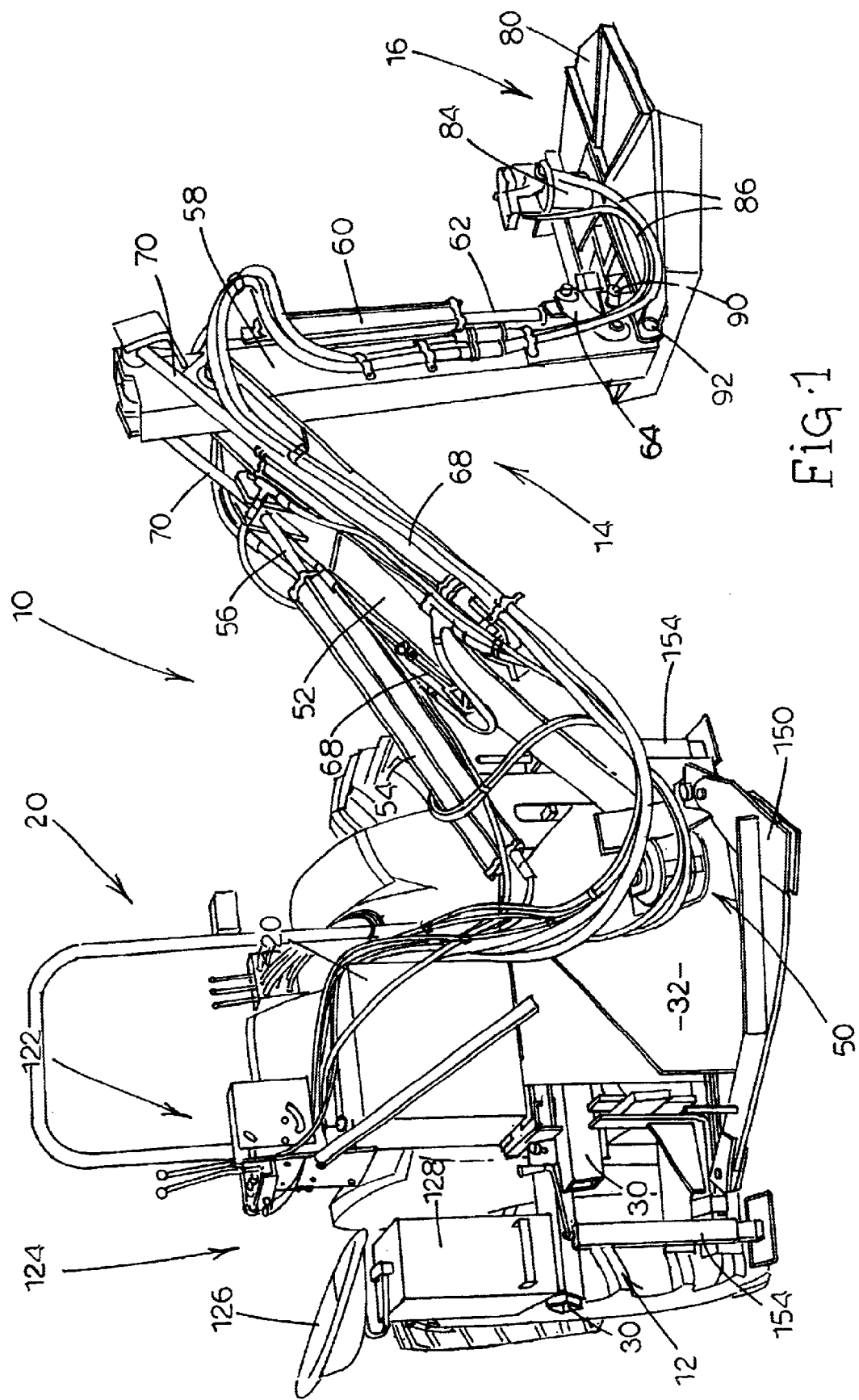
FIG. 1 is a perspective view of the tractor-mounted system of the present invention showing the boom structure thereof connected to a rotary cutter.

With further reference to the drawings, the tractor-mounted system of the present invention is shown therein and indicated generally by the numeral 10. Before proceeding with a detailed discussion of the components of the tractor-mounted system 10 it may be beneficial to review the basic components of the invention.

First, there is provided a frame structure indicated generally by the numeral 12. Frame structure 12 is mounted to the rear of a tractor indicated generally by the numeral 20. Various mounting arrangements can be employed. For example, the frame structure 12 can be attached to the tractor 20 through a conventional three-point hitch. Alternatively, a heavy duty mounting structure can be fabricated and employed where the tractor-mounted system 10 is mounted to the tractor by a series of supporting links.

Figure 3:
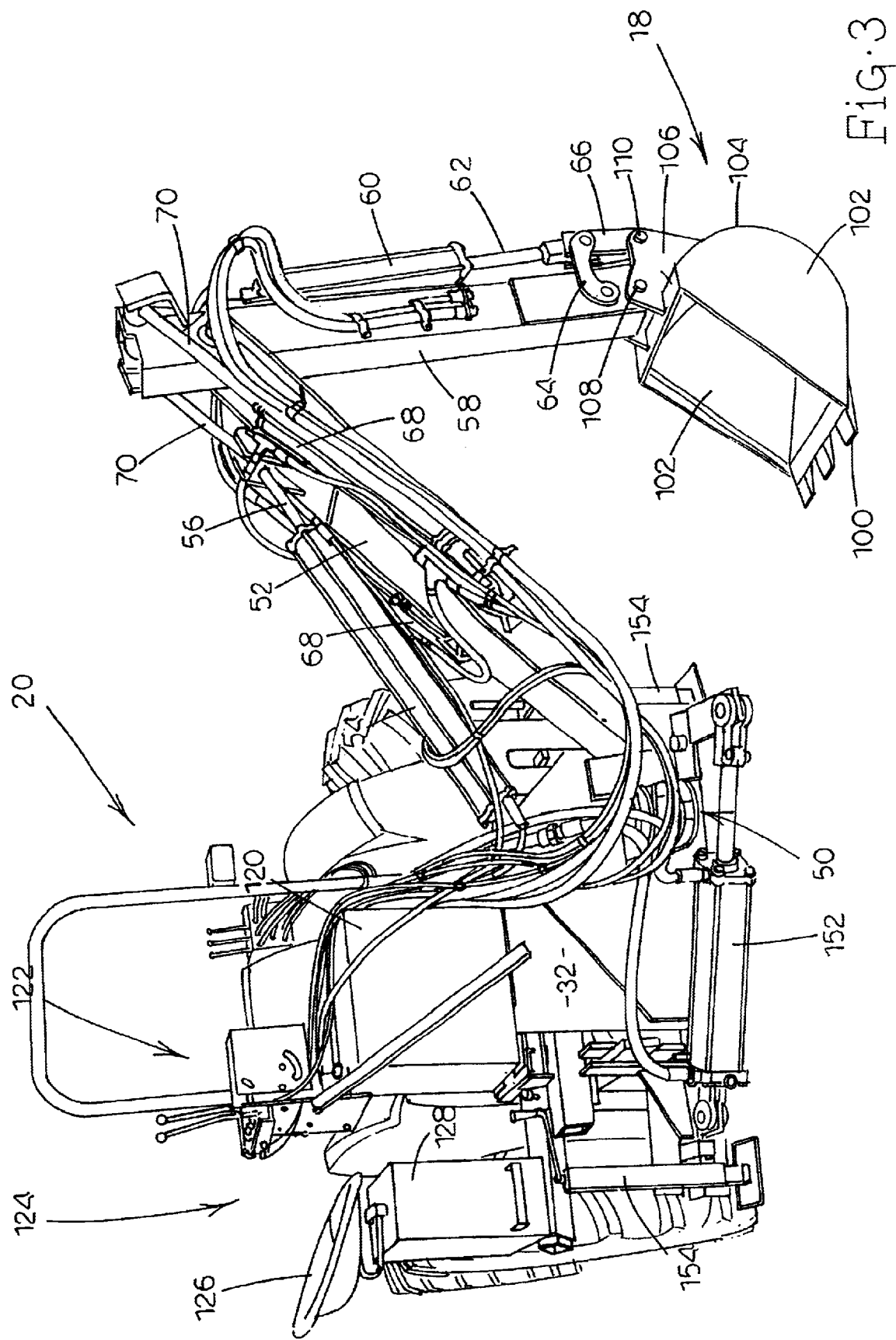
FIG. 3 is a perspective view, similar to FIG. 1, but wherein the system and particularly the boom structure has been connected to a bucket that gives rise to a backhoe.

Extending from the frame structure 12 is a boom structure indicated generally by the numeral 14. In one mode of operation, the tractor-mounted system 10 functions as a rotary cutting system. In that mode, a rotary cutter, indicated generally by the numeral 16, is mounted to the terminal end of the boom structure 14 (FIG. 1). In another mode of operation, the rotary cutter 16 is disattached from the boom structure 14 and replaced by a bucket indicated generally by the numeral 18 (FIG. 3). When bucket 18 is mounted to the boom structure 14, the tractor-mounted system 10 is effectively converted to a backhoe.

Turning now to a more detailed description of one exemplary embodiment, as noted above, the frame structure 12 may be attached to the tractor 20 in various ways. Details of the frame structure 12 will not be dealt with here in detail because such is not per se material to the present invention and further those skilled in the art will appreciate that the frame structure for supporting the tractor-mounted system 10 of the present invention may assume various designs and configurations. However, as seen in FIGS. 1 and 3, the frame structure 12 includes a number of beams or structural members and panels. In the case of the embodiment illustrated herein, it is seen that the frame structure 12 includes a transverse beam 30 and a panel structure 32.

As noted before, boom structure 14 is mounted to the frame structure 12. In order to provide a full range of motion for the boom structure 14, the boom structure is pivotally mounted to the frame structure 12 such that the entire boom structure can rotate about a general vertical axis and can swing back and forth or side-to-side such that the boom structure can either extend to the side of the tractor 20 or can be directed towards the rear of the tractor 20. To accomplish this, there is provided a swivel-mounting assembly, indicated generally by the numeral 50, incorporated into the frame structure 12. Boom structure 14 is pivotally mounted to this swivel assembly 50 such that the boom structure can rotate or swing relative to the frame structure 12.

Boom structure 14 preferably is a compound structure and can have one or more moveable components. In the case of the embodiment illustrated herein, the boom structure 14 includes a first boom 52, which may sometimes be referred to as a primary boom, and a second boom 58. Second boom 58 is pivotally connected to the end of the first boom 52. It should be noted that the first boom 52 is pivotally connected to the swivel assembly 50 such that the boom 52 can swing from side to side. In addition, the first boom 52 is connected to the swivel assembly 50 about another axis that allows the first boom 52 to move up and down.

To actuate and control the first boom, there is provided a first hydraulic cylinder 54. The first hydraulic cylinder 54 includes an anchor end that is also connected to the swivel assembly 50 such that the first cylinder 54 can rotate from side to side with the first boom 52. First hydraulic cylinder 54 includes a rod end 56 that attaches to the first boom 52 at a point outwardly from the swivel assembly 50. Thus, it is appreciated that the first hydraulic cylinder 54 can swing back and forth with the first boom 52 and by extending and retracting the rod 56 of the cylinder 54, the first boom 52 can be raised and lowered with respect to the swivel assembly 50 and the mainframe structure 12.

To actuate and move the second boom 58 with respect to the first boom 52, there is provided a pair of second hydraulic cylinders 68. Cylinders 68 are anchored to the first boom 52 and include rod ends 70 which extend to and connect to the top portion of the second boom 58 as illustrated in FIGS. 1 and 3. Note that the second boom 58 is pivotally connected to the first boom 52. However, an end portion of the second boom 58 extends past the pivot connection with the first boom 52, and the rod ends 70 of the second cylinders 68 are connected to this end portion of the boom 58 such that when the rod ends 70 of the second cylinders 68 are retracted and extended, the second boom 58 is caused to rotate about the pivot connection with the first boom 52. In the embodiment illustrated herein, there is provided two hydraulic cylinders 68. It should be appreciated, however, that a single hydraulic cylinder could be utilized to actuate and move the second boom 58 with respect to the first boom 52.

Connected on the second boom 58 is a third hydraulic cylinder 60. The third hydraulic cylinder 60 is actually anchored and supported on the second boom 58 and includes a rod end 62 extending therefrom. Rod end 62 of the third hydraulic cylinder 60 is connected to a pair of guide or control links 64 that are pivotally connected about the remote end portion of the second boom 58. This is particularly illustrated in FIGS. 2 and 4. Also connected to the rod end 62 of hydraulic cylinder 60 is a connecting link 66. Note that the connecting link 66 extends from a point where the guide links 64 are attached to the rod end 62 of the cylinder 60.

Figure 2:
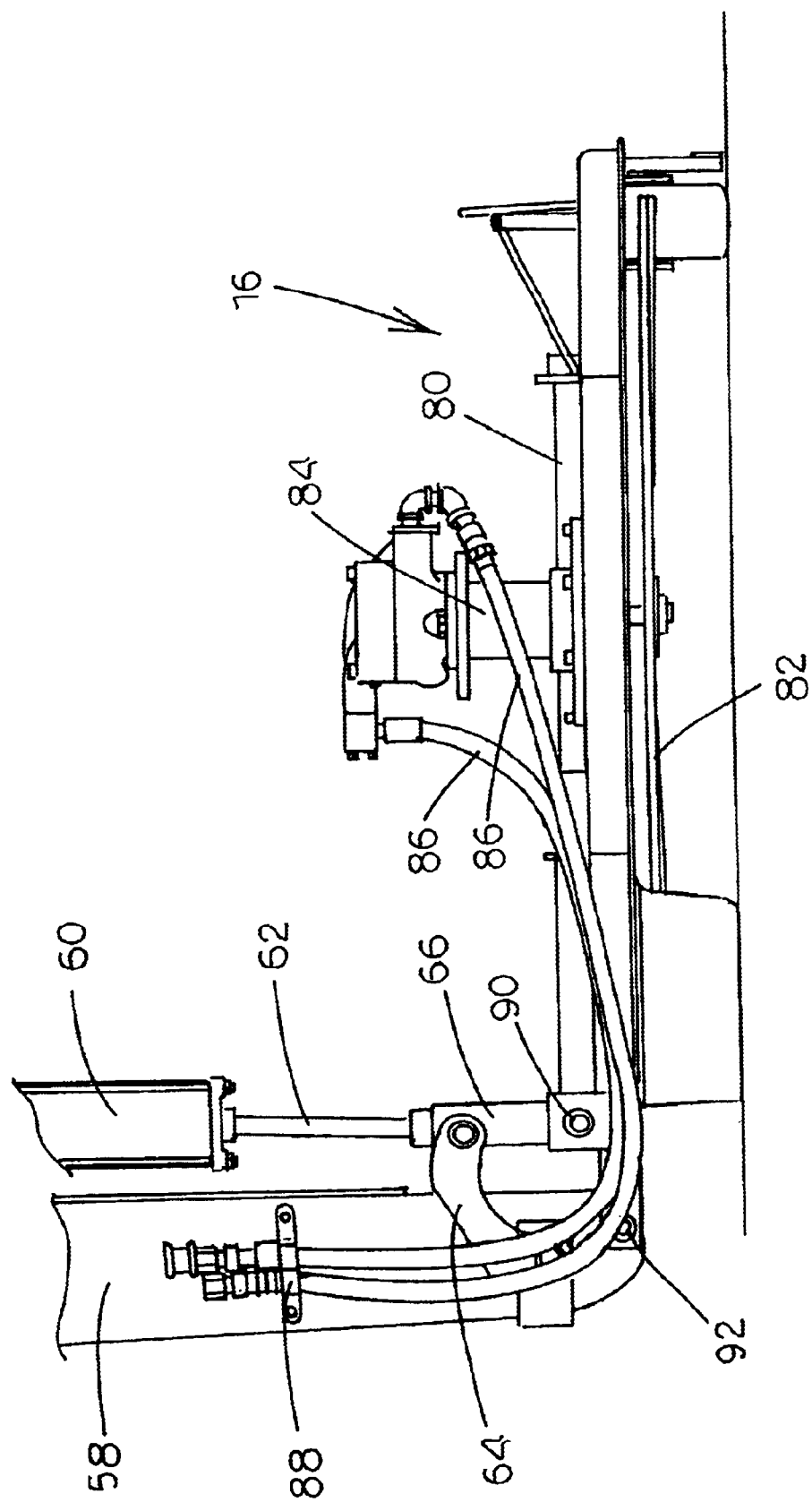
FIG. 2 is a fragmentary side elevational view showing a portion of the boom structure connected to the rotary cutter.

In one mode, the tractor-mounted system 10 of the present invention has a rotary cutter 16 attached to the terminal end of the second boom 58. This is particularly illustrated in FIGS. 1 and 2. With reference to FIGS. 1 and 2, the rotary cutter 16 includes a housing structure 80 that houses a rotary blade 82 therein. Mounted to the housing 80 is a hydraulic motor 84. A series of hydraulic hoses or lines 86 extend to and from the hydraulic motor 84. One of these lines would be deemed a pressure line and the other would be deemed a return line. As seen in FIGS. 1 and 2, there is provided a hose clip 88 that secures the hydraulic lines 86 to an intermediate portion of the second boom 58. As will be appreciated from subsequent portions of the disclosure, the tractor-mounted system 10 includes a hydraulic system and an array of hydraulic hoses and lines that would be connected to the hydraulic lines 86 at approximately where the hose clip 88 retains them to the second boom 58.

With particular reference to FIG. 2, the rotary cutter 16 is connected to both the second boom 58 and to the connecting link 66 extending from the rod end 62 of hydraulic cylinder 60. In particular, the housing 80 of the rotary cutter 16 includes a connecting structure that extends to the second boom 58 and connects thereto through a connecting pin 92. This permits the entire rotary cutter 16 to pivot about this connection point and particularly the connecting pin 92. Further, the rotary cutter 16 includes a second connecting point that is spaced from the first connecting point. This second connecting point arises by virtue of a connecting pin 90 connecting the housing 80 to the connecting link 66. Thus, the rotary cutter 16 can pivot also about the axis of the second connecting pin 90.

It is thus appreciated that the rotary cutter 16 can be articulated and moved about the terminal end of the second boom 58 by the actuation of hydraulic cylinder 60. By extending and retracting the rod 62, the entire housing 82 of the rotary cutter 16 can be rotated about both connecting pins 90 and 92.

When the rotary cutter 16 is mounted to the terminal end of the second boom 58, the tractor-mounted system 10 assumes a first mode of operation. In this mode it follows that the tractor-mounted system 10 is utilized to cut grass, bushes and other vegetation that is commonly along roadways and ditch bank areas. As noted above, the tractor-mounted system 10 of the present invention is adapted to operate in a second mode. In the second mode, the tractor-mounted system 10 becomes a backhoe.

Figure 4:
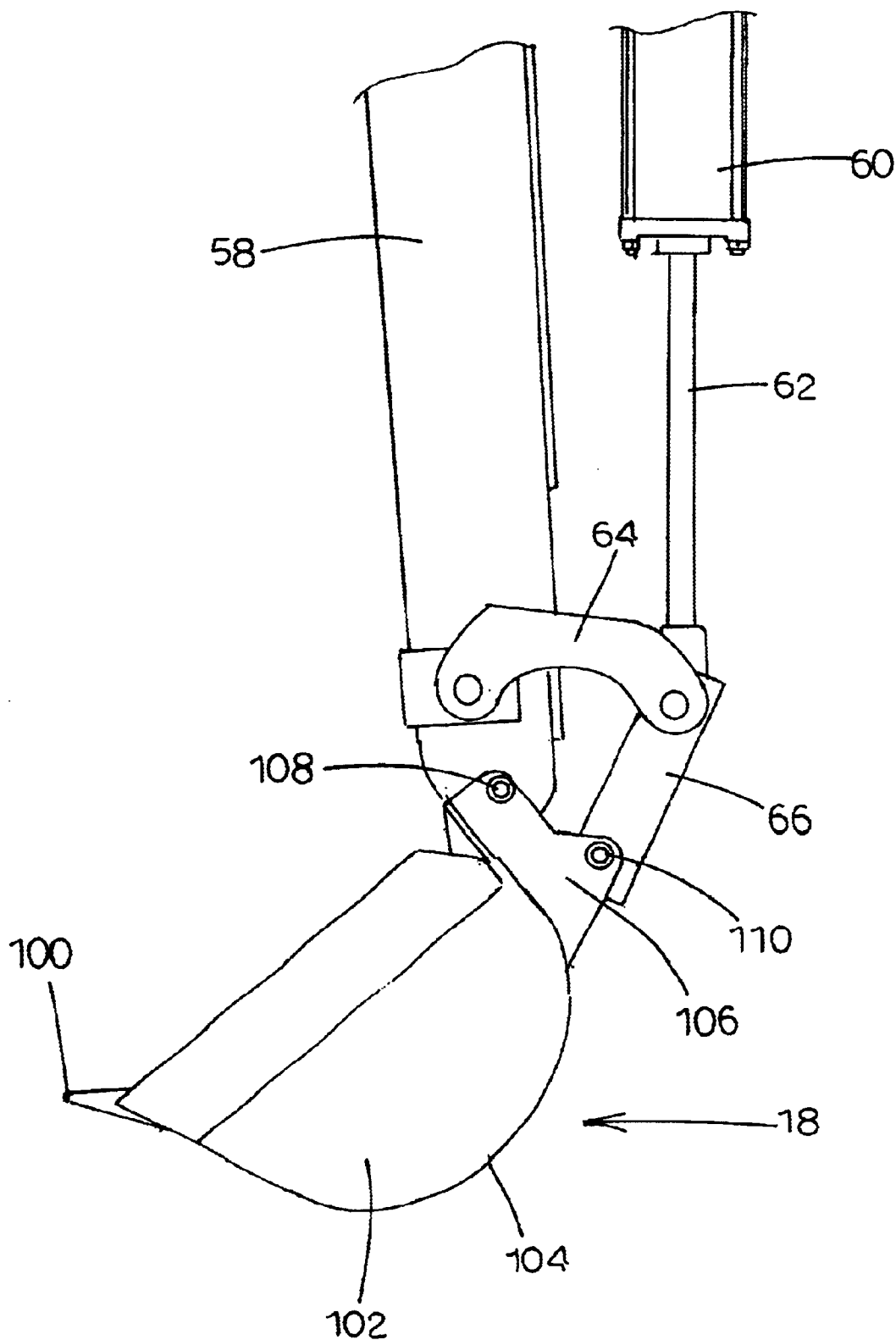
FIG. 4 is a side elevational view of a portion of the boom structure connected to the bucket.

To convert the tractor-mounted system 10 from a rotary cutting system to a backhoe, the rotary cutter 16 is disconnected from the terminal end of the second boom 58. As illustrated in FIGS. 3 and 4, once the rotary cutter has been disconnected from the second boom 58, a bucket, indicated generally by the numeral 18, can be mounted to the terminal end of the second boom 58. Viewing the bucket 18 in more detail, it is seen that the same includes a series of digging teeth 100, a pair of opposed sides, and a curved back 104. Further, to adapt the bucket 18 to be mounted to the second boom 58, the bucket is provided with a pair of connecting plates 106. As seen in FIGS. 3 and 4, the connecting plates 106 are spaced apart such that the terminal end of the second boom 58 can fit therebetween. Each of the connecting plates 106 is provided with a pair of bolt or pin openings. As illustrated in FIGS. 3 and 4, a first pin 108 connects the connecting plates 106 to the terminal end of the second boom 58. A second connecting pin 110 connects the connecting plates 106 to the connecting link 66 that extends from the rod end 62 with a hydraulic cylinder 60. Thus, it is appreciated that the bucket 18 can rotate with respect to both the second boom 58 and with respect to the pivot pin 110.

The tractor-mounted system 10 is also provided with a hydraulic system for driving the various hydraulic cylinders described above. The hydraulic system incorporated into the tractor-mounted system 10 is powered through the power take-off of tractor 20, as well as the hydraulics of the tractor. In one embodiment, the power take-off would drive the hydraulic motor 84 associated with the rotary cutter 16, while the hydraulics of the tractor would be used to power the various hydraulic cylinders. Other arrangements for driving the hydraulic components could be used. There is provided a bank of lever actuated valves 122 that are operatively connected to the respective hydraulic cylinders that make up a part of the hydraulic system. The bank of valves 122 are situated about an operator's station 124 that is located to the left side of the system as viewed in FIGS. 1 and 3. Forming a part of the operator station 124 is a seat 126. The seat is mounted atop an adjustable counterweight 128. The adjustable counterweight 128 can be moved back and forth along the beam or frame member 30 shown in FIG. 1.

There may be an additional set of hydraulic controls stationed on the tractor. These hydraulic controls would essentially be connected in parallel with respect to the bank of valves or hydraulic controls 122 disposed at the operator's station 124. This means, of course, that the hydraulic cylinders and consequently booms 52 and 58 as well as the attitude of the rotary cutter 16 and bucket 18 could be controlled from the tractor 20. It is contemplated that the controls situated on the tractor 20 would typically be used to control the booms 52 and 58 and the rotary cutter 16 when the tractor-mounted system 10 was being used for a rotary cutting operation.

When the tractor-mounted system 10 is configured with the rotary cutter 16, it is usually desirable to lock the first or primary boom 52 such that it will not move from side to side with respect to the mainframe 12 of the system 10. That is, the first boom 52 will still be able to move up and down with respect to the frame structure 12 but its side-to-side movement about the swivel assembly 50 would be locked. To achieve this, there is provided a locking link 150, shown in FIG. 1, that extends from the mainframe structure 12 or to a structure connected to the mainframe to the boom 52 or to a structure connected to the boom in the vicinity the swivel assembly 50. Again, locking link 150 simply prohibits the boom 52 from rotating side-to-side about a general vertical axis. It will not prevent the boom 52 from moving up and down with respect to the mainframe structure 12.

In a backhoe mode, it will be desirable for the main boom 52 to move from side-to-side with respect to the mainframe 12. In fact, it is desirable to provide an additional control function for powering the boom 52 from side-to-side. Therefore, in the backhoe mode, the locking link 150 is replaced by hydraulic cylinder 152 such as is shown in FIG. 3. Hydraulic cylinder 152 is controlled from the bank of control valves 122 situated at the operator's station 124. By actuating one of the valves, the rod extending from the hydraulic cylinder 152 is extended and retracted. In the process, the boom 52 is caused to swing from side to side about a general vertical axis that in the case of the embodiment disclosed would be the vertical axis of the swivel assembly 50.

The tractor-mounted system of the present invention is shown provided with a pair of adjustable mechanical jacks 154. When the system is adapted for the rotary cutting operation, the jacks 154 are riot deployed but are elevated and spaced above the underlying ground. However, when the tractor-mounted system is converted to a backhoe mode, it may be beneficial to deploy the jacks 154 so as to support the mainframe of the system 10 and to stabilize the entire structure of the system including the booms 52 and 58 such that a backhoe operation can be carried out.

The present invention has the substantial advantage of providing one system or one structure that can be adapted to either function as a rotary cutter or as a backhoe. This will enable an individual to purchase one tractor-mounted system and use that single tractor-mounted system as either a rotary cutter or as a backhoe.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A tractor-mounted system that is convertible from a rotary cutting system to a backhoe, comprising:
   a. a frame structure for mounting to the rear of a tractor;
   b. a boom structure projecting from the frame structure;
   c. in one mode of operation, a rotary cutter mounted to the boom structure for cutting grass and other vegetation;
   d. the rotary cutter adapted to be disconnected from the boom structure;
   e. in another mode of operation, a bucket mounted to the boom structure such that said system is converted to a backhoe;
   f. a first hydraulic cylinder mounted to the boom structure for cooperating with the boom structure to connect either the rotary cutter or bucket to both the boom structure and the first hydraulic cylinder;
   g. wherein in the one mode the rotary cutter is pivotally mounted at one Point to the boom structure and wherein the hydraulic cylinder extends from the boom structure and is operative to connect to the rotary cutter at another point spaced from the point where the rotary cutter is pivotally mounted to the boom structure such that the rotary cutter is suspended from the boom structure and wherein the rotary cutter while suspended from the boom structure may be articulated on the boom structure by the first hydraulic cylinder; and
   h. in the other mode the bucket is pivotally connected at one point to the boom structure and wherein the hydraulic cylinder extends from the boom structure and is operative to connect to the bucket at another point spaced from the point where the bucket is pivotally connected to the boom structure, and wherein the bucket can be articulated on the boom structure by the first hydraulic cylinder.

2. The tractor-mounted system of claim 1 including an operator's station that permits an operator to control the system from the operator station when the system is converted to a backhoe.

3. The tractor mounted system of claim 1 wherein the first hydraulic cylinder includes a rod end, and wherein there is provided at least one guide link that is pivotally connected to both the boom structure and the rod end of the first hydraulic cylinder, and a connecting link pivotally connected to the rod end of the first hydraulic cylinder and extending therefrom for connecting to either the rotary cutter or the bucket.

4. The tractor mounted system of claim 3 including a pair of spaced apart guide links and a pair of spaced apart connecting links.

5. The tractor mounted system of claim 3 wherein the connecting link interconnecting the rod end of the first hydraulic cylinder and the rotary cutter is connected at a point on the rotary cutters spaced from the point where the rotary cutter is connected to the boom structure.

6. The tractor-mounted system of claim 1 wherein the boom structure is pivotally mounted about a generally vertical axis for movement form side-to-side; and wherein the system is provided with a locking link that prevents the boom structure from moving side-to-side about the vertical axis when the system assumes the rotary cutting mode; and wherein in the backhoe mode the locking link is replaced with a second hydraulic cylinder that powers the boom structure from side-to-side.

7. The tractor-mounted system of claim 6 wherein in the rotary cutting mode the locking link is interconnected between the boom structure and the frame structure of the tractor-mounted system; and wherein in the backhoe mode the second hydraulic cylinder is connected between the boom structure and the frame structure.

8. The tractor-mounted system of claim 1 wherein the boom structure includes a first boom and a second boom pivotally connected to the first boom, and wherein there is provided at least one hydraulic cylinder for moving the first boom with respect to the frame structure, at least one hydraulic cylinder operatively interconnected between the first boom and the second boom for moving the second boom with respect to the first boom, and the first hydraulic cylinder is mounted on the second boom and includes a rod end that is connected to at least one link pivotally connected to the second boom, and wherein there is provided a connecting link connected to the rod end of the first hydraulic cylinder mounted on the second boom and extending therefrom.

9. The tractor-mounted system of claim 8 wherein in the rotary cutting mode, the rotary cutter is mounted at one point to the second boom and at a second point to the connecting link extending from the rod end of the first hydraulic cylinder mounted on the second boom; and wherein in the backhoe mode the bucket is mounted at one point to the second boom and at a second point to the connecting link extending from the rod end of the first hydraulic cylinder mounted to the second boom.

10. The tractor-mounted system of claim 9 including an operator's station provided for on the frame structure of the tractor-mounted system.

11. The tractor-mounted system of claim 10 including a hydraulic system for powering the various hydraulic cylinders associated with the first and second booms and wherein there is provided a bank of hydraulic control valves situated at the operator's station.

12. A method of converting a tractor-mounted system from a rotary cutting system to a backhoe, comprising:

mounting the system to the rear of a tractor;

connecting a rotary cutter to the end portion of a boom structure that forms a part of the tractor mounted system;

connecting a hydraulic system associated with the tractor-mounted system to the rotary cutter for driving the same;

moving the tractor along an area and cutting grass with the rotary cutter;

disconnecting the rotary cutter from the boom structure;

converting the tractor-mounted system to a backhoe by connecting a bucket to the boom structure and further operatively connecting a hydraulic cylinder that forms a part of the hydraulic system to the bucket;

controlling the boom structure and the bucket through the hydraulic system of the tractor-mounted system;

wherein the step of connecting the rotary cutter to the end portion of the boom structure comprises pivotally mounting the rotary cutter at one point to the boom structure and extending a first hydraulic cylinder from the boom structure to the rotary cutter and operatively connecting a rod end of the first hydraulic cylinder to the rotary cutter at a point spaced from the point where the rotary cutter is pivotally mounted to the boom; and wherein connecting the boom structure and the bucket comprises pivotally mounting the bucket at one point to the boom structure and extending the first hydraulic cylinder to the bucket and operatively connecting the rod end of the first hydraulic cylinder to the bucket at a point spaced from the point where the bucket is pivotally connected to the boom structure.

13. The method of claim 12 wherein the boom structure is mounted to a frame structure and is moveable from side-to-side about a generally vertical axis and wherein when the rotary cutter is mounted to the boom structure there is provided a locking link that effectively locks the boom structure for moving from side-to-side about the vertical axis.

14. The method of claim 13 wherein the locking link is connected between the boom structure and the frame structure of the tractor-mounted system.

15. The method of claim 13 wherein when the tractor-mounted system is converted to a backhoe a separate hydraulic cylinder is connected between the main frame structure and the boom structure for moving the boom structure from side-to-side about the vertical axis.

16. The method of claim 12 including providing an operator's station on the tractor-mounted system such that when the system is converted to a backhoe an operator may be positioned at the operator's station to actuate and control the backhoe.

17. The method of claim 16 wherein the operator's station includes a seat that is fixed to a counterweight that is adjustably supported on a beam that forms a part of the frame structure of the tractor-mounted system.

18. The method of claim 12 wherein both the rotary cutter and the bucket are connected at two points.

* * * * *